(12) United States Patent
Lee

(10) Patent No.: US 10,913,016 B2
(45) Date of Patent: Feb. 9, 2021

(54) FILTER DISC

(71) Applicant: Nordic Water Products AB, Västra Frölunda (SE)

(72) Inventor: Stuart Lee, Norwich (GB)

(73) Assignee: NORDIC WATER PRODUCTS AB, Västra Frölunda (SE)

( * ) Notice: Subject to any disclaimer, the term of this patent is extended or adjusted under 35 U.S.C. 154(b) by 33 days.

(21) Appl. No.: 16/218,565

(22) Filed: Dec. 13, 2018

(65) Prior Publication Data

US 2019/0111364 A1   Apr. 18, 2019

Related U.S. Application Data

(62) Division of application No. 15/701,471, filed on Sep. 12, 2017, now Pat. No. 10,220,335.

(30) Foreign Application Priority Data

Jun. 2, 2017   (SE) ..................... 1750701

(51) Int. Cl.
| | | |
|---|---|---|
| *B01D 33/23* | (2006.01) | |
| *B01D 29/05* | (2006.01) | |
| *B01D 29/58* | (2006.01) | |
| *B01D 33/06* | (2006.01) | |
| *B01D 33/21* | (2006.01) | |

(52) U.S. Cl.
CPC .............. *B01D 33/23* (2013.01); *B01D 29/05* (2013.01); *B01D 29/58* (2013.01); *B01D 33/06* (2013.01); *B01D 33/21* (2013.01); *B01D 2201/44* (2013.01)

(58) Field of Classification Search
CPC .. B01D 29/0068; B01D 29/39; B01D 29/395; B01D 29/41; B01D 29/413; B01D 29/52; B01D 33/0041; B01D 33/0048; B01D 33/0051; B01D 33/21; B01D 33/23; B01D 33/215; B01D 33/25; B01D 33/37; B01D 33/0093; B01D 2201/12; B01D 2201/127; B01D 36/001; B01D 29/05; B01D 29/58; B01D 33/06; B01D 2201/44

See application file for complete search history.

(56) References Cited

U.S. PATENT DOCUMENTS

| 4,925,557 A | * | 5/1990 | Ahlberg, Jr. ............ B01D 33/23 210/321.68 |
|---|---|---|---|
| 2006/0260999 A1 | * | 11/2006 | Danielsson ............ B01D 33/21 210/402 |
| 2011/0024347 A1 | * | 2/2011 | Larsson ................. B01D 33/23 210/331 |

* cited by examiner

*Primary Examiner* — Pranav N Patel

(74) *Attorney, Agent, or Firm* — Gabriela B. Tomescu, Esq.; Bergenstråhle & Partners AB

(57) ABSTRACT

A filter element for use in a filter disc, wherein a plurality of filter elements are arranged on a rotor shaft in a manner allowing liquid communication between the inside of the filter elements and the inside of the rotor shaft. The filter element has at least one passage in an edge structure for liquid communication between the inside of adjacent filter elements when the filter elements are assembled forming a filter disc. The passage has different passage area along the edge structure.

2 Claims, 8 Drawing Sheets

FILTER DISC

CROSS-REFERENCE TO RELATED PATENT APPLICATIONS

This application is a divisional of U.S. application Ser. No. 15/701,471, filed Sep. 12, 2017, which claims the benefit of priority to Swedish Patent Application SE-1750701-3 filed 2 Jun. 2017, the entire contents of which are hereby incorporated by reference.

TECHNICAL FIELD

The present invention relates generally to a filter element for use in a filter disc for filtering liquid containing particles, wherein a plurality of filter elements are arranged on a rotor shaft in a manner allowing liquid communication between the inside of the filter elements and the inside of the rotor shaft. Each filter element comprises optimized passages for allowing liquid communication between the inside of adjacent filter elements when arranged on a rotor shaft.

BACKGROUND ART

Filtering of liquids, such as waste water, can for example be conducted with rotary disc filters comprising one or more filter discs. Filtering may take place both from the inside out and from the outside in depending on the filter disc. When filtering is to take place from the inside out, the rotor shaft has a hollow core and the liquid to be filtered is fed to the inside of the rotor shaft. The filter element and the rotor shaft have openings through which the liquid to be filtered is fed to the inside of a filter element. The filtering takes place from the inside of the filter element and out though a filter cloth arranged on the filter element. Particles in the liquid are separated from the liquid and remain on the inside of the filter cloth.

The filter disc typically comprises one or a plurality of filter elements attached to a rotor shaft creating the disc. The rotor shaft is usually capable of carrying a plurality of such disc filters and is for example a hollow drum that can host liquid. During operation, the rotor shaft carrying the filter discs is rotated and the filter discs are partially immersed in filtered liquid during rotation.

The filter elements according to the present invention can also be used in filter discs for filtering from the outside of the filter discs and into the rotor shaft, wherein particles are deposited on the outside of the filter cloth and the filtered liquid flows into the rotor shaft.

SUMMARY OF INVENTION

Filter discs comprising multiple filter elements allowing fluid connection through passages between adjacent filter elements have drawbacks in relation to filter discs without any edge structures. The edge structures, at least partially, stops the water from flowing freely and creates a lifting force when the drum, hosting the filter disc, rotates. The rotation slightly raises the water level inside the filter element as the filter element rotates through the surface. Raising the water level inside a filter element causes back flow from the filter element back to the drum reducing the efficiency of the filter disc and increasing the risk for particles being washed back into the unfiltered water from the filter cloth arranged on the filter elements. Although such solutions have drawbacks there are also advantages with using multiple filter elements for creating a filter disc. For example, if a filter cloth is damaged it is a quick and cost efficient operation to replace a single filter element instead of repairing, or replacing, a complete filter disc.

An object of the present invention is to provide a solution that minimize the amount of back flow from the inside of the filter elements to the rotor shaft without the drawbacks of a single filter element.

Another object of the present invention is to create less disturbance in the liquid.

Yet another object of the present invention is to reduce the resistance caused by the liquid when the filter disc is rotated.

Thus the solution relates to a filter element for use in a filter disc, wherein a plurality of filter elements are arranged on a rotor shaft in a manner allowing liquid communication between the inside of the filter elements and the inside of the rotor shaft. The filter element has at least one passage in an edge structure for liquid communication between the inside of adjacent filter elements when assembled forming a filter disc. The passage has different passage area along the edge structure, i.e. the passage area of the passage along the edge structure varies.

It is one advantage with the filter element that the edge structure has a passage with different passage area along the length of the edge structure. In different embodiments, the passage can be one or multiple passages within the scope of the solution. The passage area, and how it changes along the length of the edge structure, enables optimization of the liquid flow minimizing the disturbance in the filter compartment.

As used herein the passage is one or more opening in the edge structure, or if the edge structure is applied in another way, one or more areas not covered by the edge structure.

According to one embodiment the passage area increase in an extension direction of the edge structure from the rotor shaft.

It is one advantage with the present solution that the passage area increases in the extension direction of the edge structure in a direction from the rotor shaft towards an outer periphery, or outer circumference, of the filter disc. The various parts of a filter disc travels through the water at different speeds depending of the distance from the center. The longer from the center of the filter disc, the higher speed. Through increasing the passage area along the length of the edge structure it is possible to achieve a solution wherein liquid pass through the passages in the edge structures without unnecessary disturbance.

Another advantage with the present solution is that the resistance for rotating the disc filter is reduced.

According to one embodiment the passage area increases in said extension direction from the interface between the rotor shaft and the filter element towards an outer circumference of the filter disc.

As used herein the outer circumference of the filter disc refers to the outer circumference of an assembled filter disc. Further, as used herein, the extension direction of the edge structure and along the length of the edge structure are interchangeable terms.

According to one embodiment the passage is multiple passages increasing in passage area in an extension direction of the edge structure from the rotor shaft.

According to different embodiments of the solution different designs are possible within the scope of the solution. For example, in one embodiment the passage is one passage continuously increasing in size along the extension direction of the edge structure. In another embodiment, the passage is one passage increasing in the extension direction of the edge structure from the rotor shaft. In yet another embodiment the passage is comprised of multiple passages wherein passages in the edge structure located closer to the rotor shaft has a smaller passage area than passages arranged closer to the outer circumference of the disc filter.

According to one embodiment the passage is comprised of multiple passages increasing in length in said extension direction.

According to one embodiment the combined passage area is less than 50% of the area of the edge structure.

It is one advantage with the present solution that the passage area can be reduced to below 50% of the total area of the edge structure with maintained or even increased flow rate. This enables a more rigid solution with less disturbance of the liquid inside the filter disc.

According to one embodiment the combined length of the passage is less than 50% of the length of the edge structure.

It should be noted that the combined length of the passage is measured as the length of the passage area, i.e. the length of the passage area in the edge structure and not the length from the first passage to the last passage.

In different embodiments, the edge structure and the passages have different shapes, form, length, and width. In one embodiment, a larger percent of the edge structure is a passage in a second half of the edge structure than in a first half of the edge structure, wherein the first half of the edge structure is closer to the rotor shaft than the second half.

The passage area could in different embodiment either increase along the entire length of the edge structure or increase only in some intervals, such as every 10% of the length, every 20% of the length, every 25% of the length, or any other percentage of the length. It is thereby understood that the edge structure in one embodiment may have a constant passage area for two different points in the extension direction of the edge structure without being outside the scope of the solution. For example, in one embodiment the edge structure has two or more passages arranged along its extension direction. The passages have the same width, measured perpendicular to the extension direction of the edge structure, but have different length, measured along the extension direction of the edge structure. In this embodiment the passage area increases along the extension direction by the passages becoming longer, once again in the extension direction of the edge structure, at some point, or for every passage, along the extension direction of the edge structure starting from the drum extending towards the outer circumference of the filter disc. It should further be noted that the outer circumference of the filter disc as used herein is not limited to a situation wherein a filter element, consisting of one or more filter elements, is arranged as a filter disc. The outer circumference as understood by the person skilled in the art can also be the imagined outer circumference that the filter element would constitute a part of once arranged as a filter disc.

According to one embodiment the filter element comprises at least one module with an edge structure as the center member of said module.

According to one embodiment two consecutive modules are connected to each other and forms the opposed edge structures of the inside of a filter element.

According to one embodiment the filter element is attachable to the rotor shaft through a single attachment organ.

According to one embodiment a seal is arranged between the filter element and the rotor shaft and a seal is arranged around the passage.

According to one embodiment the filter element comprises a framework carrying a filter cloth on two side surfaces extending between two opposed edge surfaces.

According to one embodiment the framework and the filter cloth are permanently joined forming a single use filter element.

According to one aspect a modular filter disc comprises filter elements as described herein. The passage of the filter elements enables liquid communication between the inside of the filter elements arranged in that specific modular filter disc.

According to one aspect for reducing disturbance in a filter disc, the following steps are performed:
equalize flow velocity through arranging multiple passages on an edge structure of a filter element, wherein passages closer to the rotation center have a smaller passage area than passages arranged further from the rotation center of said filter disc, and
arranging an edge structure between said passages.
According to one embodiment:
liquid in a filter disc is partly entrained by the edge structure, and
the passage area is adapted based on the expected rotation speed of the filter disc.

BRIEF DESCRIPTION OF DRAWINGS

The invention is now described, by way of example, with reference to the accompanying drawings, in which.

DESCRIPTION OF EMBODIMENTS

In the following, a detailed description of the different embodiments of the solution is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the filter disc and/or filter elements.

Briefly described the solution relates to a filter element for use in a filter disc. A plurality of filter elements is arranged on a rotor shaft in a manner allowing liquid communication between the inside of the filter elements and the inside of the rotor shaft. The filter elements are further adapted to allow liquid communication between adjacent filter elements via passages in edge structures of said filter elements. The passages are not the same in size along the length of the edge structure, or at least the passage area changes at least once along the length of the edge structure.

Figure 1:
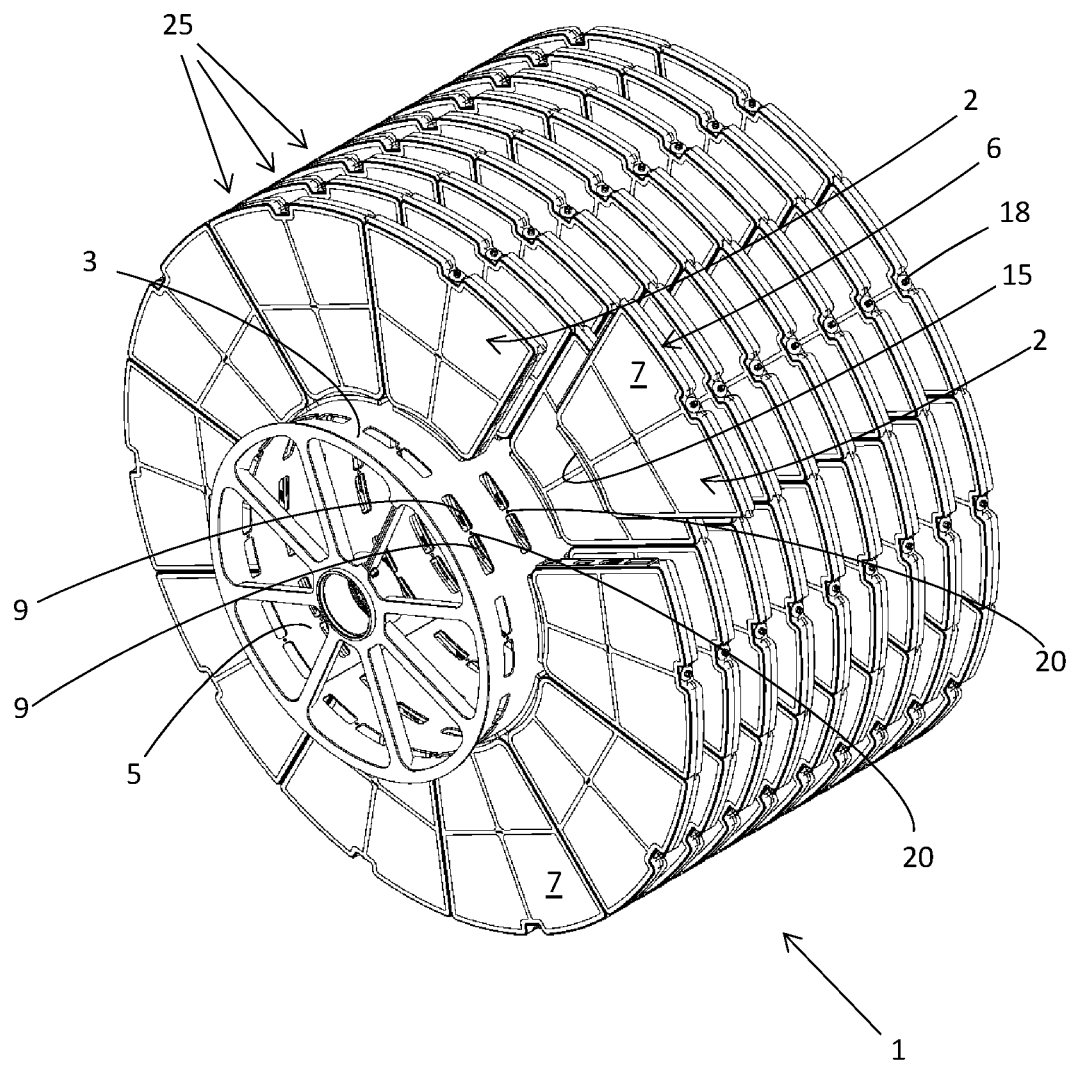
FIG. 1 illustrates a disc filter comprising multiple filter discs which each comprise multiple filter elements.

FIG. 1 illustrates disc filter 1 comprising a plurality of filter discs 25 arranged on a rotor shaft 3. The plurality of filter discs 25 together creates a disc filter 1 being the assembled structure used for filtering liquids. The filter discs 25 each comprises multiple filter elements 2 that are arranged around the rotor shaft 3, normally each filter element 2 is attached to the rotor shaft 3 via some form of attachment means 18. The number of filter elements 2 in each filter disc 25 as illustrated in FIG. 1 is only an example and any number of filter elements 2 can be arranged on the rotor shaft 3 creating a filter disc 25. However, it should be noted that a filter disc 25 based on a filter element 2 according to the present solution comprise at least two filter elements 2.

Figure 3:
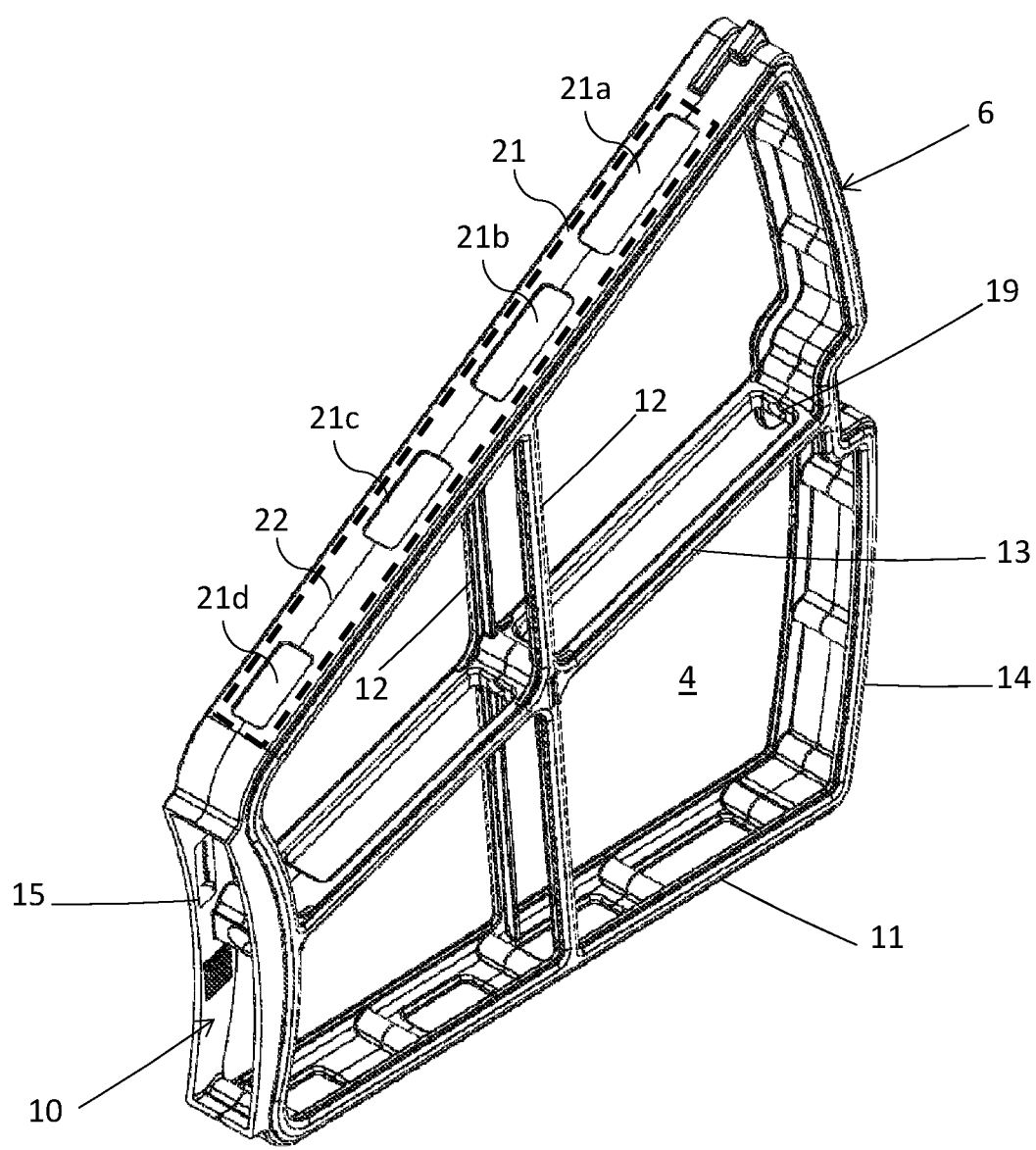
FIG. 3 illustrates one embodiment of a filter element.
Figure 6:
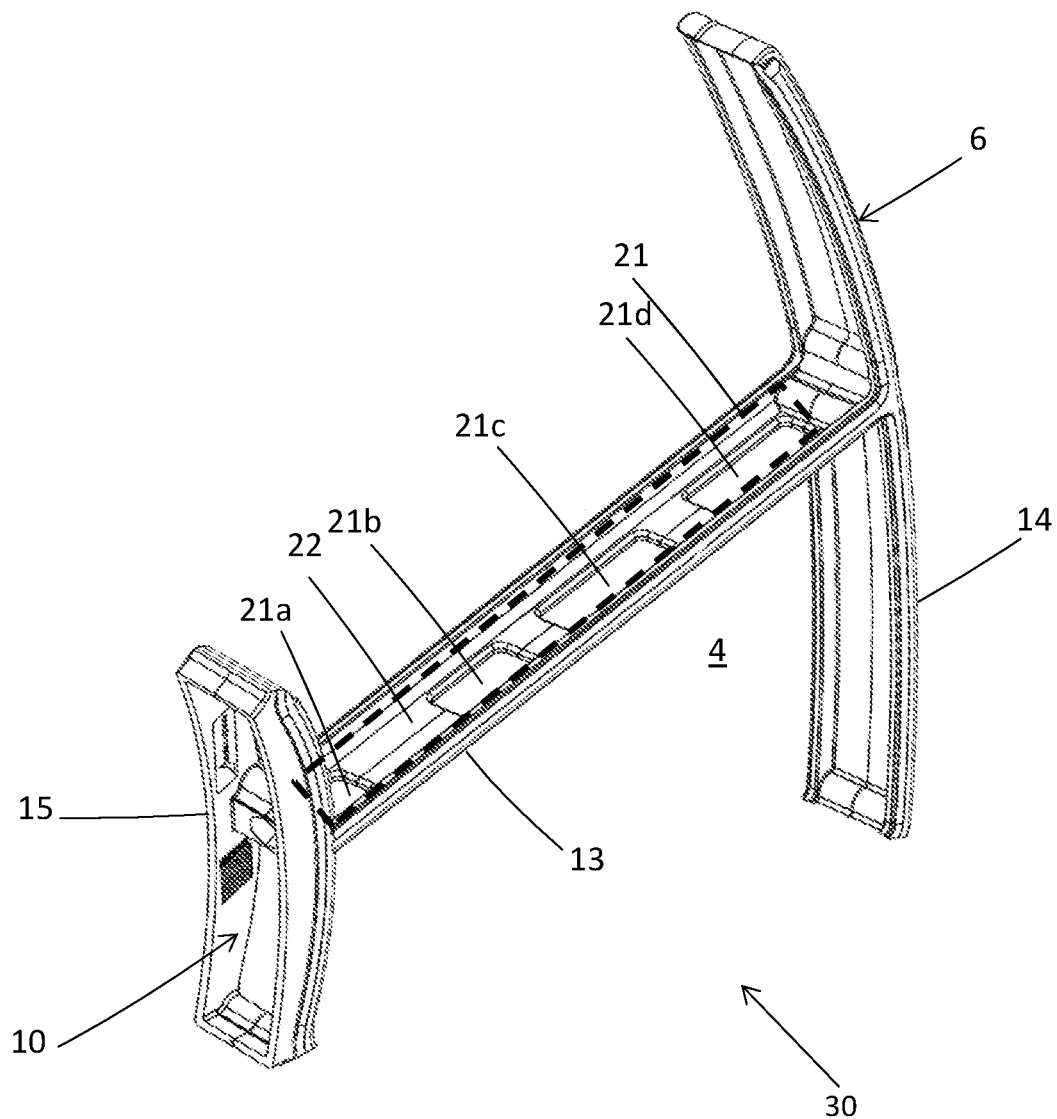
FIG. 6 illustrates a module of a filter element.

The filter element 2 is according to one embodiment a single component comprising a framework 6, a filter cloth 7, two edge structures 22, and passages 21; 21*a*, 21*b*, 21*c*, 21*d* adapted to allow liquid connections to adjacent filter elements 2. In another embodiment the filter element 2 is constituted of two modules 30 each having an edge structure 22 as a center member, such an embodiment will further be described in FIG. 6 and the description relating thereto. The inside 4 of a filter element 2 is a compartment created by the space between two edge structures 22 of a filter element 2 independently if said edge structures 22 are part of the same unit as illustrated in FIG. 3 or if it is comprised by multiple modules 30 as illustrated in FIG. 6.

FIG. 1 further illustrates the rotor shaft 3 with openings 9 for liquid communication between filter elements 2 and rotor shaft 3. The rotor shaft 3 is any form of drum or hollow shaft that can host liquid and is illustrated for example in FIG. 1. When liquid is filtered from the inside and out the rotor drum 3 first receives the liquid and the liquid is thereafter passed through the openings 9 into filter elements 2. In different embodiments different numbers of openings 9 could be adapted for liquid connection between a filter element 2 and the rotor shaft 3. The number of openings 9 may in different embodiments be for example one, two, or three openings 9 per filter element 2. However, any number of opening 9 suitable for the solution could be used. The rotor shaft 3 is at least in part hollow and thereby has an inside 5 wherein liquid can flow.

The filter elements 2 can be fastened in different ways to the rotor shaft 3, for example in one embodiment via a long bolt fastened into a threaded opening 20 in the drum. In one embodiment a fastening means 18, such as a nut or bolt, is further arranged in the opposite end of the long bolt to secure the filter element 2.

According to another embodiment multiple bolts are used to attach each filter element 2. According to some embodiments a gasket is arranged between the filter element 2 and the rotor shaft 3.

Figure 2A:
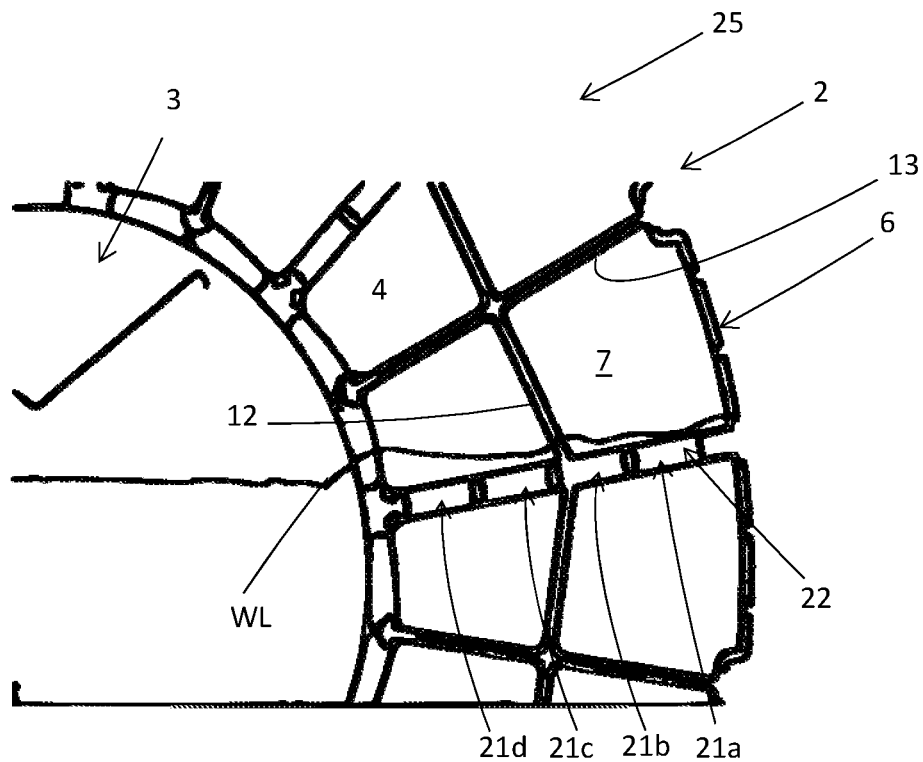
FIG. 2a illustrates a flow simulation of a prior art solution.

FIG. 2*a* illustrates a flow simulation of a prior art solution wherein a disc filter 25 is rotated. The illustration as shown in FIG. 2 is a snap shot of a flow simulation wherein the filter disc 25 is rotated counter clockwise. Thereby the edge structure 22 is currently passing through the surface of the liquid as can be seen by the illustrated liquid level WL. The liquid level WL at the inside 4 of the filter element 2 is affected by the edge structure 22 of the filter element 2 and the passages 21*a*, 21*b*, 21*c*, 21*d*. However, the edge structure 22 is needed to create a rigid structure. As can be seen from the flow simulation in FIG. 2*a* the liquid is forced upwards when the filter disc 25 rotates creating a wave of liquid going back into the rotor shaft 3, i.e. a backwash. This backwash transports already separated particles back into the liquid of the rotor shaft 3 reducing the performance of the filter element 2 and the entire disc filter 1. Thereby, filtered particles are filtered multiple times with different parts of the liquid. The passages 21*a*, 21*b*, 21*c*, 21*d* in the solution of the prior art each has the same size.

Figure 2B:
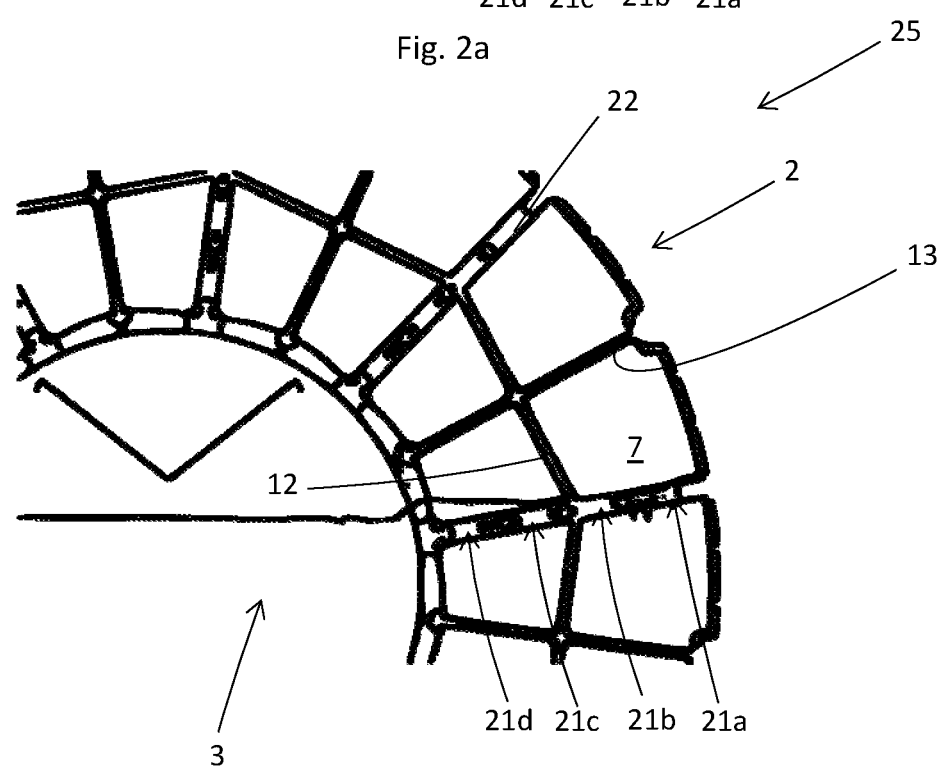
FIG. 2b illustrates a flow simulation of one embodiment of the inventive solution as described herein.

FIG. 2*b* illustrates a flow simulation of a filter disc 25 comprising filter elements 2 according to the present solution. The setting is the same as in the illustration of FIG. 2*a* but instead of equally sized passages 21*a*, 21*b*, 21*c*, 21*d* the passage area of the passages 21*a*, 21*b*, 21*c*, 21*d* is different along the length of the edge structure 22. As can be seen from the illustration in FIG. 2*b* the passages 21*a*, 21*b*, 21*c*, 21*d* have different sizes. The different passage area is optimized for a disc filter 25 that rotates. As can be seen the liquid level WL at the inside of the filter element 2 is still affected by the rotation but the disturbance is significantly reduced in comparison to the prior art solution. Thereby, a solution is achieved wherein the surface area is reduced but the disturbance of the liquid is reduced due to a better flow rate.

FIG. 2*b* further illustrates one embodiment of how the passage area changes along the length of an edge structure 22. It should be noted that the same effect as illustrated between FIGS. 2*a* and 2*b* can be achieved with the other embodiments as described herein.

FIG. 3 illustrates one embodiment of a filter element 2. The filter element 2 comprises a framework 6 that in one embodiment comprises a frame 11, a crossbar 12 and a central support 13 extending from the outer part 14 of the frame 11, forming a part of the periphery in the outer circumference of the filter disc 25 when in use, to a connecting part 15, adjacent to the rotor shaft 3 when in use.

FIG. 3 further illustrates the edge structure 22 with multiple passages 21*a*, 21*b*, 21*c*, 21*d*. The multiple passages together constitute the passage 21 and the passage area is, as illustrated in FIG. 3, different between the different passages 21*a*, 21*b*, 21*c*, 21*d*. The filter element 2 further comprise an inside 4 and the liquid is in one embodiment filtered from either the inside 4, through a filter cloth 7 (not shown in FIG. 3), to the outside of the filter disc, or in the opposite direction. An opening 10 in the filter element 2 in one embodiment allows for liquid connection between the filter element 2 and the rotor shaft 3. FIG. 3 also shows the inside 4 of the filter element 2 and the inside 4 is further delimited by a filter cloth 7 (not shown in FIG. 3).

Figure 4:
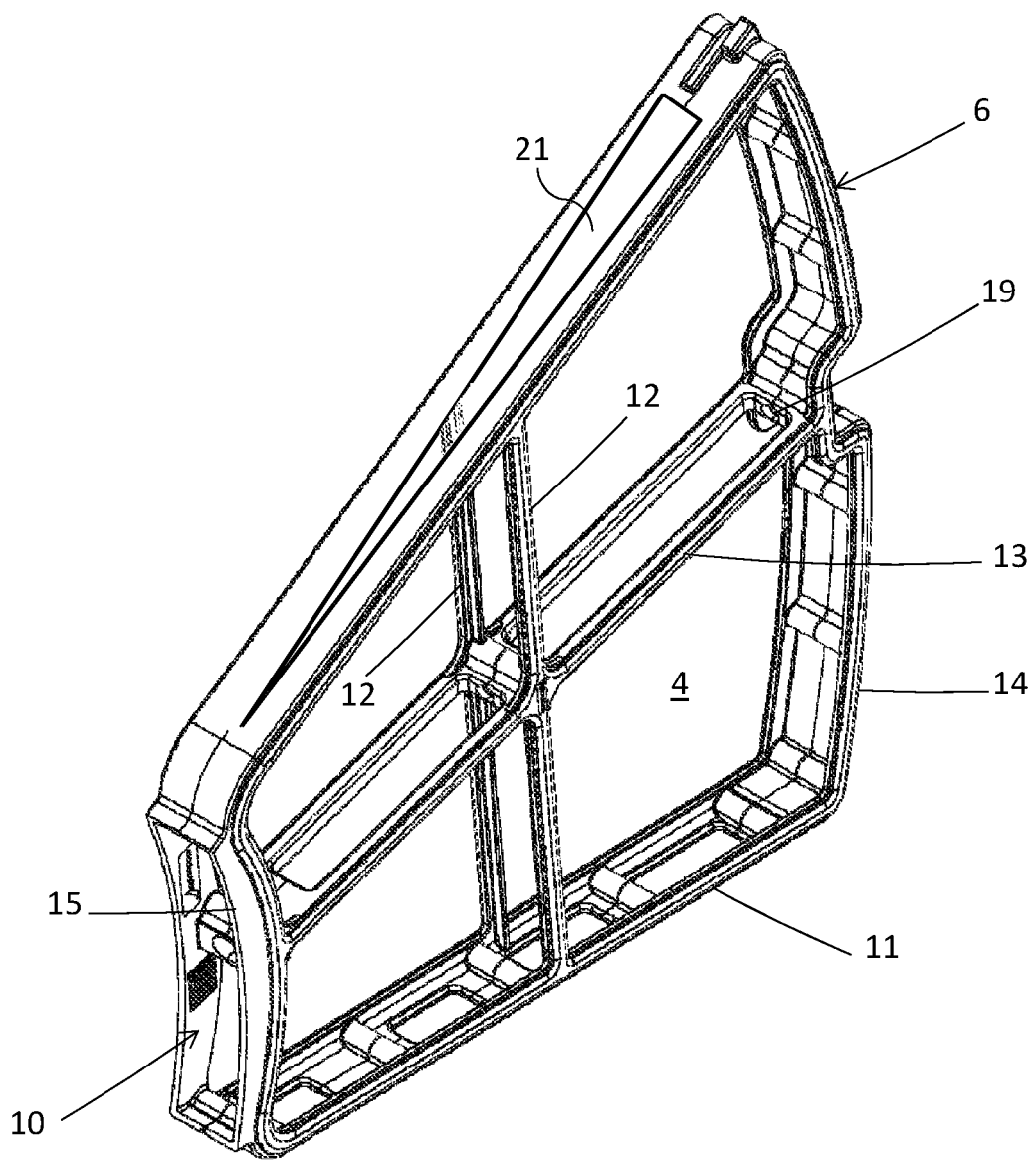
FIG. 4 illustrates another embodiment of a filter element.

FIG. 4 illustrates another embodiment of the filter element 2 wherein the passage 21 is an elongated passage extending over a large portion of the length of the edge structure 22. The elongated passage area can in one embodiment be used in combination with the embodiment of FIG. 3 or in one embodiment is the wedge shaped passaged as illustrated in FIG. 4 used for both edge structures 22 of a filter element 2. The person skilled in the art further understands that the shape and form of the passage 21 can be different within the scope of the solution as described herein and that the embodiments as shown herein are merely examples.

Figure 5:
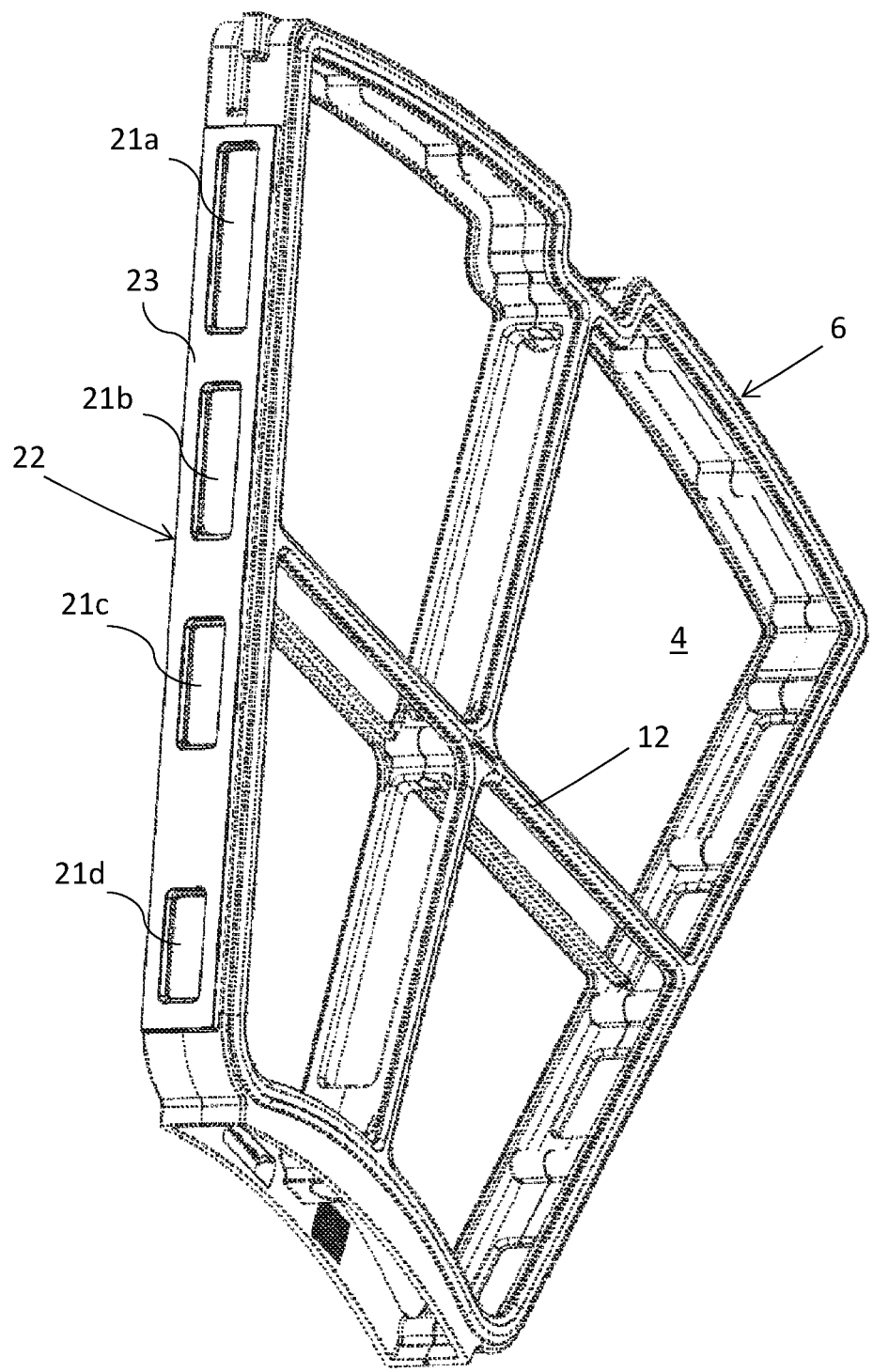
FIG. 5 illustrates one embodiment of a filter element with a seal.

FIG. 5 illustrates one embodiment of the filter element 2 wherein a gasket 23 is arranged on the edge structure 22. The gasket 23 is adapted to seal between two adjacent filter elements 2.

FIG. 6 illustrates another embodiment wherein each filter element 2 has two modules 30 that together creates the filter element 2. Thereby, in the embodiment as illustrated in FIG. 6 the edge structure 22 is arranged as a center member of a module 30. The modules 30 are adapted to be arranged around the rotor shaft 3 and each module 30 is part of two insides 4 of filter elements 2. As for the other embodiments described herein a filter cloth 7 (not shown in FIGS. 2-6) arranged on two sides of the filter element 2.

Figure 7:
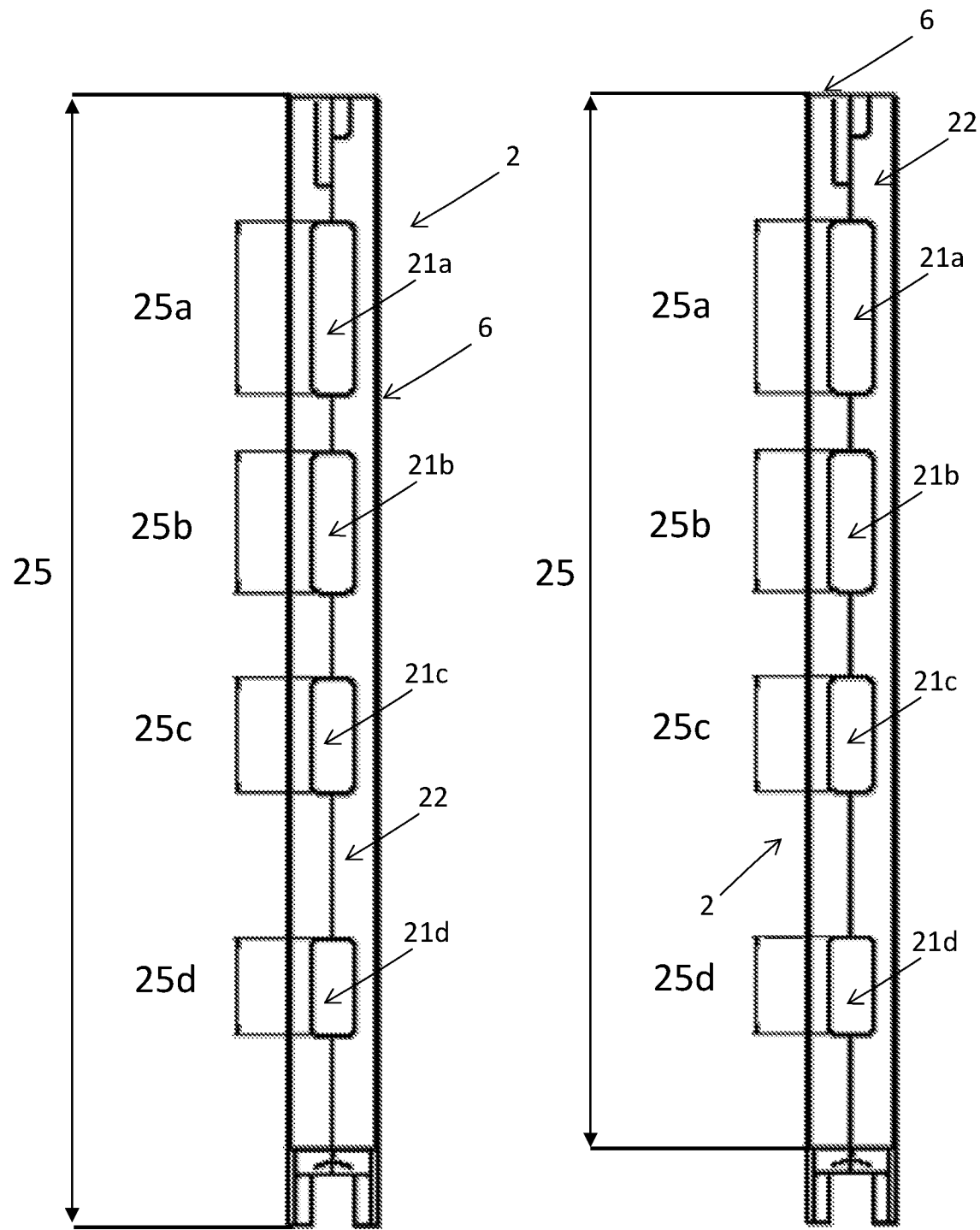
FIG. 7a illustrates a side view of a filter element with the edge structure and multiple passages visible.
FIG. 7b illustrates a side view of a filter element with the edge structure and multiple passages visible.

FIG. 7a illustrates one embodiment of a filter element 2 seen from the side wherein the length 25 of the filter element 2 is defined as the entire length of the filter element 2. Along the length 25 there are multiple passages 21a, 21b, 21c, 21d arranged in the edge structure 22 that each has a length 25a, 25b, 25c, 25d. In one embodiment the combined length of the passages 21a, 21b, 21c, 21d is less than 50% of the entire length 25 of the filter element. In another embodiment the passages area is less than 50% of the total area of the edge structure 22.

FIG. 7b illustrates another embodiment wherein the length 25 is illustrated, and defined, as the length of the edge structure 22. In one embodiment the combined length of the passages 21a, 21b, 21c, 21d is less than 50% of the entire length 25 of the edge structure 22.

Figure 8:
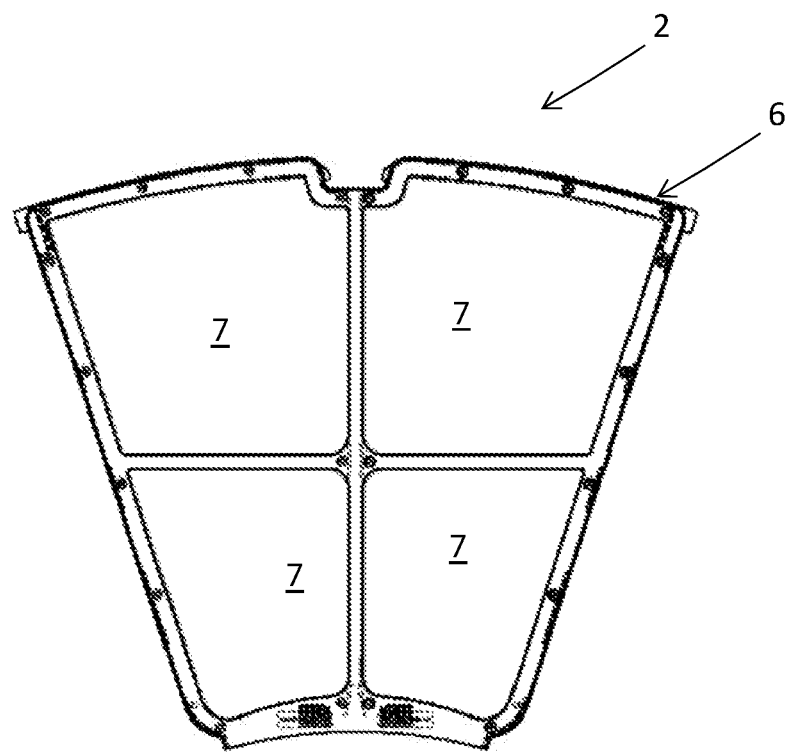
FIG. 8 illustrates a filter element wherein a filter cloth is illustrated.

FIG. 8 illustrates a filter element 2 wherein a filter cloth 7 is illustrated on the filter element 2. The filter cloth 7 may in different embodiments be attached to the filter element 2 in different ways. For example, in one embodiment the filter cloth 7 is glued to the framework 6. In one embodiment filter cloth 7 is pressed between the framework 6 and a frame holding the filter cloth 7, wherein the frame has substantially the same shape as the filter element 2. In another embodiment the filter cloth 7 is form as a bag and the framework 6 is placed within the filter cloth 7 that thereby surrounds the framework 6.

Even if some illustrations as presented herein illustrates the filter element 2 without a filter cloth 7 each filter element 2 is adapted to host a filter cloth 7. The filter cloth 7 can be of different materials, such as plastic, fabric, non-woven material, or any other suitable material. The filter cloth 7 may in different embodiments be for example tensioned to the framework 6 of the filter element 2 or arranged like a bag around the filter element 2. In some embodiments the filter cloth 7 is glued to the filter element 2, in some embodiment the filter cloth 7 is pressed between two parts of the filter element 2, in some embodiment the filter cloth 7 could be attached to the filter element 2 with any other form of attaching means.

The invention claimed is:

1. A method for reducing disturbance in a filter disc, wherein the method comprises the steps of:
    equalizing flow velocity through arranging multiple passages, each passage having a passage area, in an edge structure of a filter element attached to a rotor drum having a rotation center, the filter element being part of a filter disc, wherein passages closer to the rotation center of the rotor drum have a smaller passage area than passages arranged further from the rotation center of the rotor drum.

2. The method according to claim 1, wherein:
    liquid in the filter disc is partly entrained by the edge structure, and
    the passage area of at least one passage is determined based on an expected rotation speed of the filter disc.

* * * * *